Jan. 19, 1926.                                                                1,570,274
F. MÜLLER
POWER TRANSMISSION CHAIN
Original Filed April 19, 1923
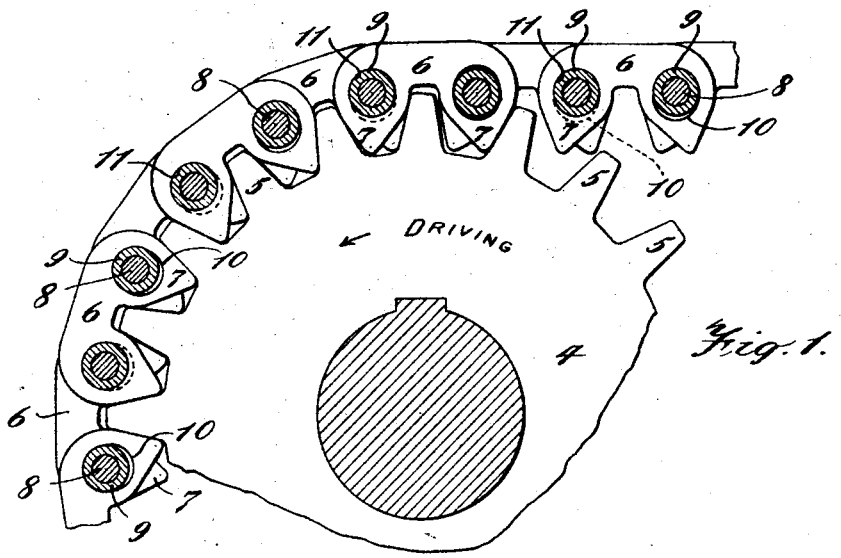
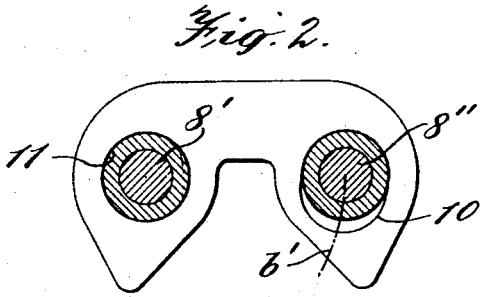
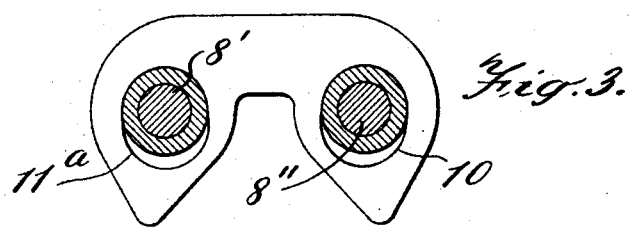
INVENTOR.
Friederich Müller
BY
His ATTORNEYS Patented Jan. 19, 1926.

1,570,274

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed April 19, 1923, Serial No. 633,116. Renewed October 19, 1925.

*To all whom it may concern:*

Be it known that I, FRIEDERICH MÜLLER, a citizen of the United States, residing at Hartford, in the county of Hartford and State of Connecticut, have invented certain new and useful Improvements in Power-Transmission Chains, of which the following is a specification.

My invention relates to improvements in power transmission chains and particularly to that character or type of chain which embodies a plurality of overlapping links pivotally connected at their overlapping portions, the teeth of which are adapted to co-operate with teeth on driving and driven gears; and it consists of certain novel parts, and combinations of parts, particularly pointed out in the claim concluding these specifications.

The following is a description of my invention embodied in forms at present preferred by me; but it will be understood that various modifications and changes may be made therein without departing from the spirit of my invention and without exceeding the scope of my claim.

In the accompanying drawings, Figure 1 is an elevation, partly in section, of a gear and chain embodying my invention. Fig. 2 is an enlarged detail of the link shown in Fig. 1; and Fig. 3 is an enlarged detail of a modification thereof.

Referring to Figure 1, 4 is a gear, in this case assumed to be a driving gear, moving in the direction shown by the arrow, which gear is provided with teeth 5, 5. The chain shown comprises a plurality of links 6, 6, each link being provided with teeth 7, 7, adapted to engage with the teeth on the gear. 8, 8 are pivots on which the links are mounted and 9, 9 are bushings surrounding said pivots. The construction of a chain having the elements above described is well known and need not be described more in detail. Indeed, my invention is applicable to all chains of this general type and is not confined to the details here shown.

Referring to Figure 2, each link of the chain shown in Figure 1 has an aperture 10 at one end which is larger than the aperture 11 at the other end of the link. The smaller aperture 11 is circular and substantially fits the pivot on which it is mounted, but the fit is a turning fit. Where a bushing 9 is employed, as shown in Figure 1, this bushing preferably has a turning fit on the pivot pin 8. The larger aperture 10 is elongated in form, the elongation being at an angle other than a right-angle with respect to the length of the link—or, in other words, is inclined with respect to the length of the link. The dotted line $b'$ is struck from the center of the pivot $8'$, so that as the end of the link containing the aperture 10 moves with respect to its pivot $8''$ the effective length of the link remains unchanged. This is the form of construction at present preferred by me, but the inclination of the aperture 10 may be greater than here shown, so that the effective length of the link is shortened as the end of the link containing the aperture 10 moves with respect to the pivot $8''$ with beneficial results under certain conditions.

Referring to Figure 3, both ends of the link are provided with elongated apertures as described above. In this case I prefer to make the inclination of the aperture 10, or the aperture $11^a$ or both, such that the effective length of the link is shortened as one, or the other, or both ends move with respect to its pivot member, as this tends to compel the link to travel in the prescribed and desired pitch-line.

The motion of the link independent of its pivot member results in decreasing the noise usually accompanying the operation of such chains, thereby aiding in making a so-called "noiseless" chain, and increasing the ease of running and life of the chain. The inclination of the elongated opening with respect to the length of the link herein described further contributes to these desirable results.

In chains of the character described, the pivots are usually riveted fast to the end plates, which end plates may, or may not, be provided with driving teeth. In chains embodying my present invention, it is preferable that the plates to which the pivots are riveted and in which they have, therefore, no freedom of motion, are so formed as to perform no driving function; or, in other words, to be idle with respect to said function.

The words "pivot member" in the claim will be understood to include not only a pivot proper, but also a bushing surrounding the pivot proper, when said bushing is used.

What I claim is:

In a power-transmitting chain comprising links arranged in overlapping relation, each link being provided with an aperture affording a turning fit on its pivot members and at the opposite end with an aperture elongated with respect to its pivot member and inclined with respect to the length of the link.

FRIEDERICH MÜLLER.